Oct. 18, 1955
G. W. BOWLES
2,721,307
ART OF LOCATING ACCIDENTAL GROUNDS IN UNGROUNDED
ELECTRIC POWER DISTRIBUTION SYSTEMS
Filed Aug. 11, 1952
2 Sheets-Sheet 2
FIG. 2.
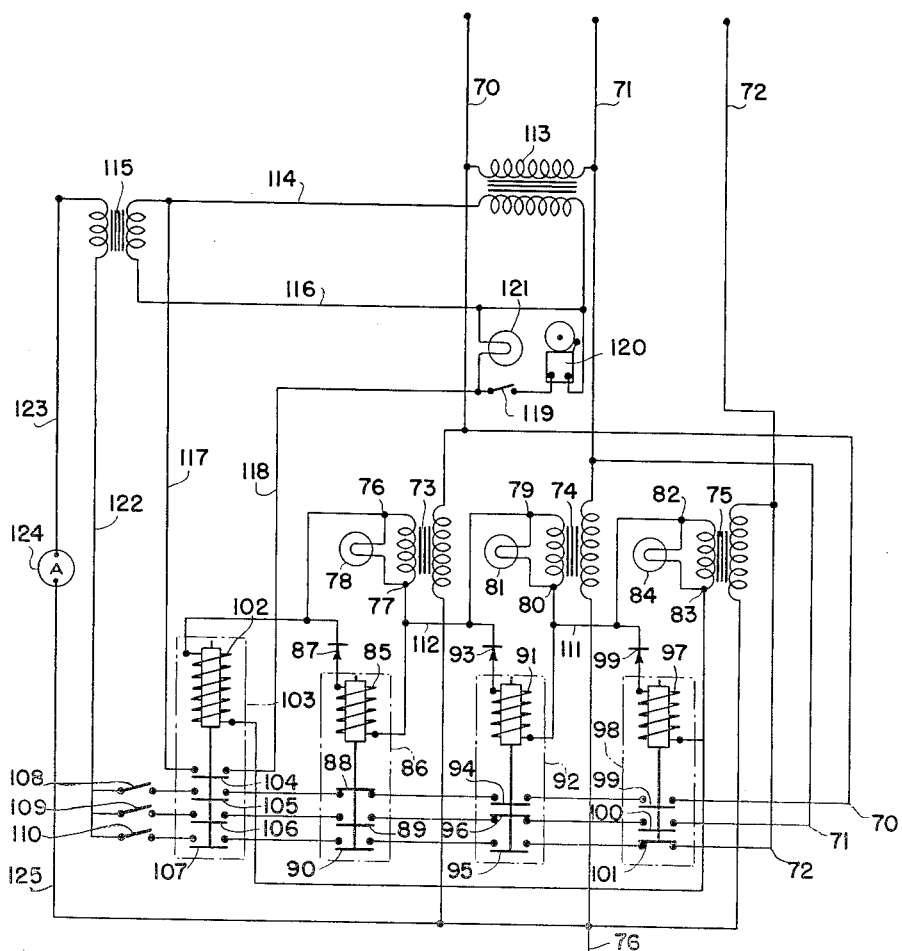
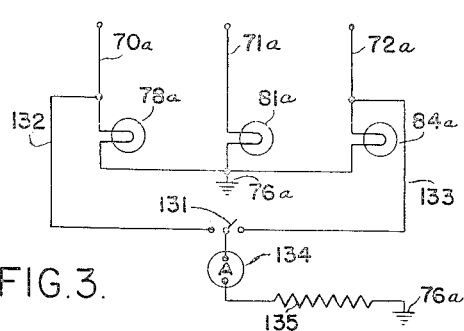
FIG. 3.
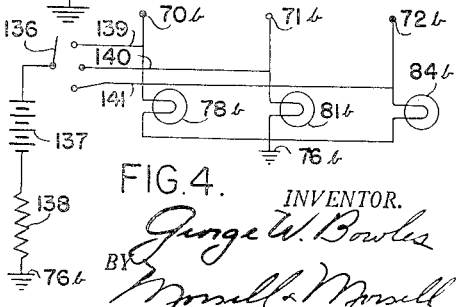
FIG. 4.
INVENTOR.
George W. Bowles
BY
Morrell & Morrell
ATTORNEYS

United States Patent Office 2,721,307
Patented Oct. 18, 1955

2,721,307

ART OF LOCATING ACCIDENTAL GROUNDS IN UNGROUNDED ELECTRIC POWER DISTRIBUTION SYSTEMS

George W. Bowles, Green Bay, Wis., assignor to Fort Howard Paper Company, Green Bay, Wis., a corporation of Wisconsin Application August 11, 1952, Serial No. 303,791

6 Claims. (Cl. 324—52)

This invention relates to improvements in the art of locating accidental grounds in ungrounded electric power distribution systems.

In an ungrounded three phase electric power distribution system, the three system wires normally operate at a potential of line voltage divided by 1.732 above ground potential. In a 440 volt system this potential is approximately 254 volts. When one wire of this system becomes grounded, however, the voltage to the ground of the two ungrounded wires rises from line voltage divided by 1.732 to full line voltage, or from 254 to 440 volts in a 440 volt system.

One of the principal factors affecting the life of electrical insulation is the voltage. Other factors are heat and time. The heat factor under designed load is substantially constant, and if a wire operates at a steady load for an indefinite period, the time cannot be controlled. The only controllable variable having a direct bearing on the life of the insulation, then, is voltage. In order to prolong the useful life of the insulation to the greatest extent, it is important that the voltage be maintained as low as possible at all times.

Obviously, when one wire of a three wire ungrounded system becomes grounded, the resultant full line voltage on the two ungrounded lines puts excessive stress on the insulation, and decreases its useful life correspondingly. It is important, therefore, that an accidental ground be located and isolated from the system as soon as possible after it occurs, so that the life of the insulation on the ungrounded lines is not substantially shortened by the resultant overload.

With the above in mind, it is a general object of the present invention to provide an improved method and apparatus for readily locating an accidental ground in an ungrounded power distribution system.

A further object of the invention is to provide an improved method and apparatus of the class described wherein a traceable ground current is caused to flow in the grounded line, and wherein the flow of said ground current is traced in said line to the accidental ground.

A further object of the invention is to provide an improved apparatus of the class described by which an operator can locate an accidental ground from a central control panel.

A more specific object of the invention is to provide in an improved apparatus of the class described, a plurality of low range window type transformers, each located at a point in the system where it is desired to check for grounds, the system wires being passed through the windows of said transformers and the secondaries of the latter normally having no current flowing therein. When, however, one of the system lines is accidentally grounded, and when a ground current is caused to flow in the accidentally grounded line, a current is induced in the secondary winding of the transformers through which said ground current flows in the accidentally grounded line.

A further object of the invention is to provide an improved apparatus of the class described, which is positive, efficient, and safe in its operation, and which is otherwise well adapted for the purposes described.

A further object of the invention is to provide an improved method and apparatus of the class described which is adaptable to single phase systems as well as to polyphase systems, and wherein D. C. as well as A. C. sources of ground current can be used.

With the above and other objects in view, the invention consists of the improved method of and apparatus for locating accidental grounds in ungrounded electric power distribution systems, and all of the steps, parts and combinations incident thereto, as set forth in the claims, and all equivalents thereof.

In the drawings accompanying and forming a part of this specification, wherein three forms of the invention are shown, and wherein like characters of reference indicate the same parts in all of the views:

Fig. 2 is a schematic diagram of one form of ground current impressing apparatus adapted for use with the ground detecting apparatus of Fig. 1;

Fig. 3 is a schematic diagram of a simplified form of ground current impressing apparatus adapted for use with the ground detecting apparatus of Fig. 1; and Fig. 4 is a schematic diagram of another simplified form of ground current impressing apparatus adapted for use with the ground detecting apparatus of Fig. 1.

Figure 1:
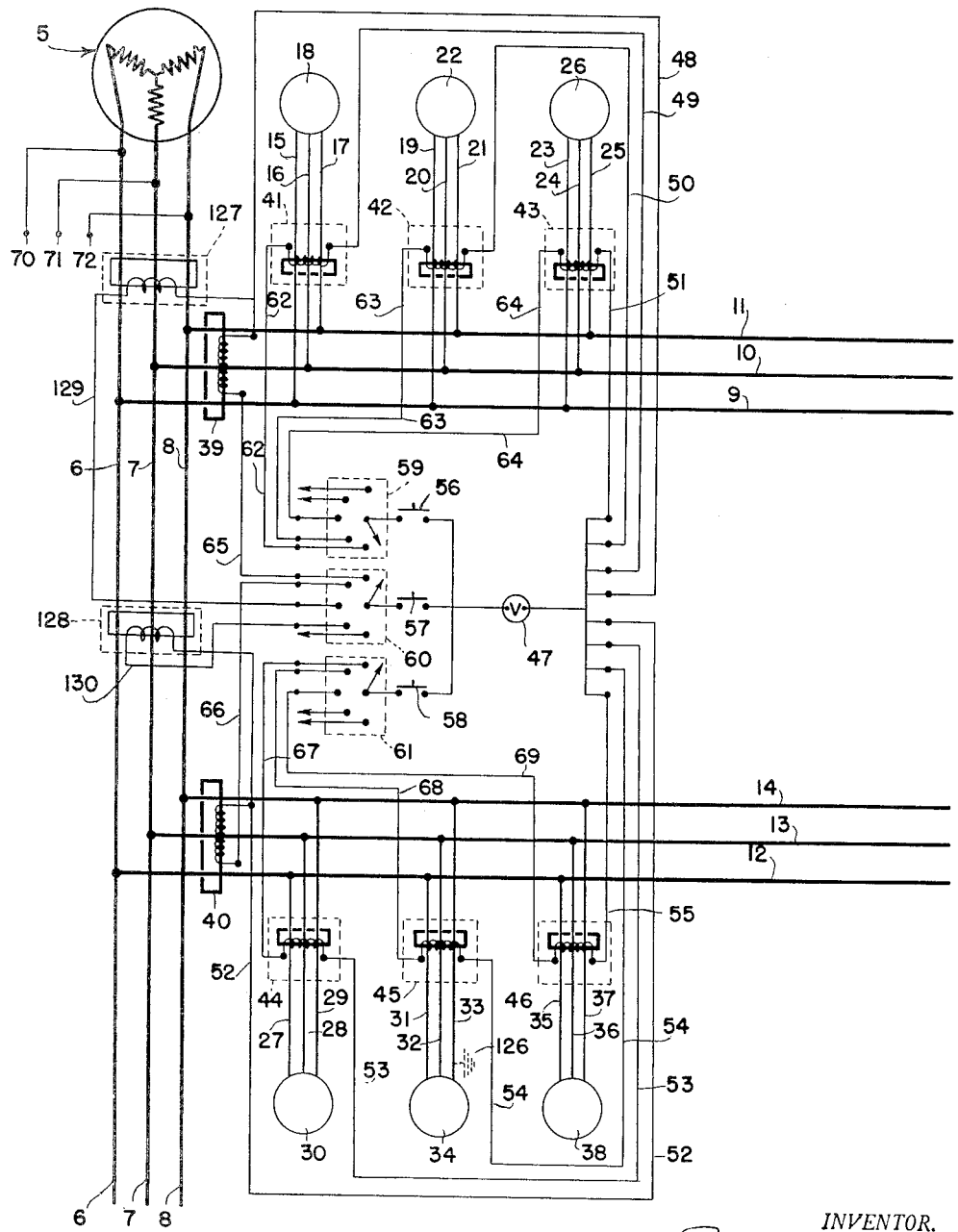
Fig. 1 is a schematic diagram of an electrical distribution system of the three phase ungrounded type equipped with a ground detecting apparatus constructed in accordance with the invention.

Referring more particularly to Fig. 1 of the drawing, the numeral 5 indicates a three phase ungrounded source of electrical current which may take the form of a generator, transformer or the like. The numerals 6, 7 and 8 indicate conductors which are connected to the source 5 and which form a main power supply line. Conductors 9, 10 and 11 are connected respectively to main supply line conductors 6, 7 and 8 and form a branch feeder circuit. Conductors 12, 13 and 14 are also connected respectively to main supply line conductors 6, 7 and 8 and form a second branch feeder circuit.

Conductors 15, 16 and 17 are connected respectively to conductors 9, 10 and 11 and form a motor branch circuit supplying a motor 18. Conductors 19, 20 and 21 are also connected respectively to conductors 9, 10 and 11 and form a motor branch circuit supplying a motor 22. Similarly, conductors 23, 24 and 25 are connected respectively to conductors 9, 10 and 11 and form a motor branch circuit supplying a motor 26.

Conductors 27, 28 and 29 are connected respectively to conductors 12, 13 and 14 and form a motor branch circuit supplying a motor 30. Conductors 31, 32 and 33 are connected respectively to conductors 12, 13 and 14 and form a motor branch circuit supplying motor 34. Conductors 35, 36 and 37 are connected respectively to conductors 12, 13 and 14 and form a motor branch circuit supplying motor 38.

Associated with the main supply line and each of the branch feeder and motor branch circuits is a low range window type transformer, the design of which is preferably such that an indication of current flow can be read at its secondary terminals with a current of approximately one ampere flowing in a one turn primary. The three wires of the associated circuit are passed through the "window" of the transformer, and when normal load current is carried by said wires, no current is induced in the secondary of the transformer. In this specification, the window type transformers will be referred to by the term groundconductors.

Groundconductor 39 is associated with the branch feeder circuit formed by conductors 9, 10 and 11 and is located near the connection of the branch feeder with the main supply line. The groundconductor 40 is associated with the branch feeder circuit formed by conductors 12, 13 and 14 and is also located near the connection of said circuit with the main supply line. Groundconductors 41, 42 and 43 are associated respectively with the motor branch circuits supplying motors 18, 22 and 26, being preferably located near the starting boxes (not shown) of said motors. Groundconductors 44, 45 and 46 are associated respectively with the motor branch circuits supplying motors 30, 34 and 38 and are preferably located near the starting boxes (not shown) of said motors. Groundconductors 127 and 128 are associated with the main supply line. The groundconductor 127 is preferably positioned between the source 5 and the branch feeder formed by conductors 9 to 11, and the groundconductor 128 is preferably positioned between the two branch feeders shown in Fig. 1.

One secondary terminal of groundconductors 127, 39, 41, 42 and 43 are connected to one side of a volt meter 47 through conductors 48, 49, 50 and 51 respectively. Similarly, one secondary terminal of groundconductors 128, 40, 44, 45 and 46 are connected to the same side of the volt meter 47 through conductors 52, 53, 54 and 55 respectively. The opposite side of the volt meter 47 is connected to one contact of each of three normally open push button type switches 56, 57 and 58. The other contact of switch 56 is connected to the blade of a multi-point selector switch 59; the other contact of switch 57 is connected to the blade of a multi-contact selector switch 60; and the other contact of switch 58 is connected to the blade of a multi-contact selector switch 61.

Three of the contacts of selector switch 59 are respectively connected, as by conductors 62, 63 and 64, to the other secondary terminals of groundconductors 41, 42 and 43. The other secondary terminals of groundconductors 39, 40, 127 and 128 are connected respectively to separate contacts of the selector switch 60, as by conductors 65, 66, 129 and 130 respectively. The other secondary terminals of groundconductors 44, 45 and 46 are connected to three contacts of the selector switch 61, as by conductors 67, 68 and 69 respectively. The switches 56 to 61 and volt meter 47 are preferably mounted on a central control panel. Conductors 70, 71 and 72 are preferably connected respectively to conductors 6, 7 and 8 between source 5 and the groundconductor 127, as shown in Fig. 1, and are adapted to be connected to any of the ground current impressing circuits shown in Figs. 2 to 4.

Referring now to Fig. 2, the conductors 70, 71 and 72 are connected respectively to one primary terminal of transformers 73, 74 and 75, the other primary terminals of said transformers being connected to a common ground, as at 76. The transformer 73 has a pair of secondary terminals 76 and 77 across which an indicating lamp 78 is connected. The transformer 74 has a pair of secondary terminals 79 and 80 across which an indicating lamp 81 is connected, and the transformer 75 has a pair of secondary terminals 82 and 83 across which an indicating lamp 84 is connected.

The coil 85 of a relay 86 is also connected across the terminals 76 and 77 of transformer 73 and may have a rectifier 87 in series therewith. The relay 86 has a set of normally closed contacts 88 and sets 89 and 90 of normally open contacts. The coil 91 of a relay 92 is connected across the terminals 79 and 80 of transformer 74 and may have a rectifier 93 in series therewith. The relay 92 has sets 94 and 95 of normally open contacts, and has a set of normally closed contacts 96. The coil 97 of a relay 98 is connected across the terminals 82 and 83 of transformer 75 and may have a rectifier 99 in series therewith. The relay 98 has sets 99 and 100 of normally open contacts, and has a set of normally closed contacts 101. The secondary terminal 80 of the transformer 74 is connected to the secondary terminal 82 of the transformer 75, as by conductor 111, and the secondary terminal 77 of transformer 73 is connected to the secondary terminal 79 of transformer 74, as by conductor 112.

The coil 102 of a relay 103 is connected between the terminal 76 of transformer 73 and the terminal 83 of transformer 75. The relay 103 is provided with sets of normally open contacts 104, 105, 106 and 107. One contact of a normally open switch 108 is connected in series with the contacts 105 of relay 103, contacts 88 of relay 86, contacts 94 of relay 92, contacts 99 of relay 98, and with line 70. One contact of a normally open switch 109 is connected in series with contacts 106 of relay 103, contacts 89 of relay 86, contacts 96 of relay 92, contacts 100 of relay 98, and with the conductor 71. One contact of a normally open switch 110 is connected in series with the contacts 107 of relay 103, contacts 90 of relay 86, contacts 95 of relay 92, contacts 101 of relay 98, and with the conductor 72.

The primary coil of a transformer 113 may be connected across the conductors 70 and 71 as shown, or may be connected to any other suitable source of power. One side of the secondary coil of said transformer is connected, as through conductor 114, to one side of the primary coil of a high reactance type transformer 115. A conductor 116 connects the other side of the secondary of transformer 113 to the other side of the primary of the transformer 115. A conductor 117 connects one of the contacts 104 of relay 103 with the conductor 114, and a conductor 118 connects the other contact 104 with one side of a normally closed switch 119. A bell 120 is connected between the other side of the switch 119 and the conductor 116, and an indicating lamp 121 is connected across the conductors 116 and 118 as shown.

A conductor 122 connects one side of the secondary coil of the transformer 115 to the other side of each of the switches 108, 109 and 110. A conductor 123 connects the other side of the secondary coil of transformer 115 to an ammeter 124, the other side of said ammeter being connected to the ground 76 by a conductor 125.

The operation of the form of the invention shown in Figs. 1 and 2 will now be described. It will be assumed that an accidental ground occurs on conductor 33 leading to motor 34, as indicated in dotted lines at 126. This produces a current path of low resistance between the grounds 126 and 76, and the primary winding of the transformer 75 is thereby short-circuited. The short-circuit upsets the voltage balance between transformers 73, 74 and 75 so that the primary voltage across transformers 73 and 74 increases from line voltage divided by 1.732 to full line voltage, whereas the primary voltage across transformer 75 drops to zero. The secondary voltage of transformers 73 and 74 increases correspondingly with the increased primary voltage, and the lamps 78 and 81 glow brightly, whereas the lamp 84 has no illumination.

Relays 86, 92 and 98 are so constructed that under normal balanced line voltage conditions their solenoids are not sufficiently energized to actuate their plungers. However, when the voltage in the system becomes unbalanced as a result of accidental grounding of one of the lines, such as grounding of line 72, through accidental ground 126 in conductor 33, the increased voltage on the coils 85 and 91 causes the latter to actuate the plungers of relays 86 and 92. This opens contacts 88 of relay 86 and contacts 96 of relay 92, and closes contacts 89 and 90 of relay 86 and contacts 94 and 95 of relay 92. The unbalanced condition of the system also causes the voltage in relay coil 102 to rise from approximately zero to a figure equal to 1.732 times the primary voltage of transformers 73 and 74 divided by the transformer ratio of said transformers. This energizes coil 102 and causes the plunger of relay 103 to close contacts 104, 105, 106, and 107. Closing of contacts 104 completes the circuit between the secondary of transformer 113, conductors 114, 117, 118, lamp 121, switch 119 and bell 120, illuminating the lamp 121 and causing bell 120 to ring. This indicates to the operator that an accidental ground has occurred in the distribution system.

The operator can stop the ringing of bell 120 by opening switch 119. In addition, by inspecting lamps 78, 81 and 84 it will be apparent to him that since lamp 84 is not illuminated the accidental ground is in line 72 or in one of the conductors to which this line is connected, i. e., conductors 8, 11, 14, 17, 21, 25, 29, 33 or 37.

Switches 108, 109 and 110 are mounted on a central control panel adjacent the ground indicating lights 78, 81 and 84 respectively. On receiving an indication of a system ground, the operator closes the switch associated with the indicating light which is not illuminated, switch 110 in the present instance. This permits current to flow from one side of the secondary coil of transformer 115 through conductor 122, switch 110, contacts 107, 90, 95 and 101, and through conductors 72, 8, 14 and 33 to the accidental ground 126. The current flows through the low resistance external ground path between grounds 126 and 76 and reenters the system through ground 76, conductor 125, ammeter 124 and conductor 123 to the other side of the secondary of transformer 115, thereby completing the ground current circuit. The transformer 115 is of the high reactance type which inherently limits the current flow available from its secondary winding. The current from transformer 115 flowing through line 72 does not return to conductor 125 through the primary winding of transformer 75, since this winding has high impedance. The current instead takes the path of least resistance provided by the low resistance ground path between accidental ground 126 and ground 76.

Current from transformer 115 is thus impressed on or caused to flow in the line which is accidentally grounded. Normal load current in the three system wires produces no reaction in the secondaries of the ground conductors, but when the system becomes unbalanced as a result of an accidental ground, and a ground current of predetermined magnitude is caused to flow in the accidentally grounded line, a measurable voltage is induced in the secondaries of all of the groundconductors through which the ground current flows in the accidentally grounded line. In the present instance a measurable voltage is induced in the secondaries of groundconductors 45, 40, 128 and 127.

In locating the grounded line, the operator first depresses the push button switch 57 and turns the blade of the switch 60 to make successive contact with the conductors 65, 66, 129 and 130. Since current is flowing in the secondaries of groundconductors 127, 128, and 40, the voltmeter 47 will give a reading when the blade of switch 60 contacts the conductors 129, 130 and 66. This indicates to the operator that the accidental ground is beyond the groundconductor 40 in the branch feeder circuit formed by conductors 12, 13 and 14. The operator then depresses the push button switch 58 and moves the blade of switch 61 successively into contact with conductors 67, 68 and 69. Since current is flowing in the secondary of groundconductor 45, the voltmeter 47 will give a reading when the blade of switch 61 contacts the conductor 68. This reading indicates to the operator that the accidental ground is in the motor branch circuit for the motor 34, and his previous observation of lamps 78, 81 and 84 indicates to him that said ground is in conductor 33. If circumstances permit, the operator can then cut the motor 34 out of the circuit and correct the accidental ground condition.

While it is preferred to have a groundconductor permanently located at each position at which it is desired to check for grounds, and to have the groundconductors all wired back to a central panel, a single portable groundconductor of the split ring type may be used to check for grounds at all of the various points. A low range "clip-on" type ammeter can also be used for this purpose. Also, the source of the ground current may be separate from the distribution system, if desired, rather than as shown.

In Fig. 3 a simplified form of circuit for indicating the existence of an accidental ground and for causing the flow of a ground current through the accidentally grounded line is shown. Conductors 70a, 71a and 72a are adapted to be connected to conductors 70, 71 and 72 respectively of the circuit shown in Fig. 1. The numerals 78a, 81a and 84a are applied to ground indicating lamps which are connected respectively to conductors 70a, 71a and 72a as shown. The lamps 78a, 81a and 84a, are also connected to a common ground 76a. A single pole double throw switch 131 has one contact connected to the conductor 70a through a conductor 132, the other contact of said switch being connected to the conductor 72a by a conductor 133. The blade of switch 131 is connected to one side of an ammeter 134, the other side of said ammeter being connected to one side of a resistor 135 of predetermined resistance. The other side of resistor 135 is connected to a ground 76a to form a low resistance ground path between resistor 135 and the accidental ground 126 (Fig. 1).

In the operation of the form of the invention shown in Fig. 3, occurrence of the accidental ground 126 causes light 84a to become extinguished, while at the same time lamps 78a and 81a glow brightly. This indicates to the operator that line 72 or a line connected thereto is accidentally grounded. By moving the blade of switch 131 into contact with conductor 132, a ground current circuit is completed through which the system voltage drives a ground current. This ground current flows from source 5 through conductors 8, 14 and 33 to the accidental ground 126, at which point said current enters the external low resistance ground path. This current reenters the system through ground 76a (Fig. 3) and returns to the source 5 through resistance 135, ammeter 134, switch 131, conductor 132, conductor 70a and conductor 70.

The resistance of resistor 135 is of such size that the current driven through the circuit is of sufficient magnitude to induce a measurable voltage in the secondaries of the groundconductors through which said current flows in the accidentally grounded line. The exact location of the accidental ground is found by tracing the flow of the ground current by manipulation of switches 56 to 61 and by observation of the voltmeter 47 in the manner previously described.

In use of the circuit shown in Fig. 3, a resistance of 440 ohms and 500 watts has worked out satisfactorily for the resistor 135 in a 440 volt system. Also, 6 watt, 6 volt transformer type lighting units having 440 volt primaries have worked out satisfactorily in place of each of lamps 78a, 81a and 84a in a 440 volt system. Another satisfactory alternative to the use of said lamps is the use of a separate voltmeter in place of each lamp.

Fig. 4 shows a circuit for impressing a ground current from an external direct current source on the accidentally grounded line of a system. The conductors 70b, 71b and 72b are adapted to be connected respectively to conductors 70, 71 and 72 of Fig. 1. Conductors 70b, 71b and 72b are connected respectively to lamps 78b, 81b and 84b, said lamps also being connected to a common ground 76b. A multi-contact switch 136 has a separate contact connected to each of conductors 70b, 71b and 72b through conductors 139, 140 and 141 respectively, the blade of said switch being connected to one side of a battery 137. The other side of battery 137 is connected to a resistor 138, and the other side of said resistor is connected to the ground, as at 76b to provide a low resistance ground path between said resistor and the accidental ground 126 (Fig. 1). A 6 volt battery, and a 6 ohm, 10 watt resistor have worked out satisfactorily when used in the circuit shown, in Fig. 4.

In the operation of the form of the invention shown in Fig. 4, occurrence of an accidental ground 126 causes lamp 84b to become extinguished, while lamps 78b and 81b glow at full brilliance. This indicates to the operator that an accidental ground has occurred, and that it is in line 72 or in a line connected therewith. The operator then turns the blade of switch 136 to make contact with conductor 141, thus connecting the battery 137 to the grounded line and completing a ground current circuit.

In the ground current circuit, direct current flows from the battery 137 through switch 136, conductors 141, 72b, 72, 8, 14 and 33, and enters the external ground path through accidental ground 126. The ground current re-enters the circuit through ground 76b and returns to the battery 137 through resistor 138. The ground current thus impressed upon the grounded line is of sufficient magnitude to be measured by a portable clip-on direct current ammeter.

It is apparent that in each form of the invention the accidental ground is located by causing a traceable ground current to flow in the grounded line, and by tracing the flow of said current to the point at which it enters the external ground path at the accidental ground.

Various changes and modifications may be made without departing from the spirit of the invention, and all of such changes are contemplated as may come within the scope of the claims.

What I claim is:

1. In an apparatus for locating an accidental ground in a normally ungrounded electric power distribution system: a window type current transformer through which the lines of said system are passed, said transformer having a secondary winding; an electrical measuring instrument connected to said transformer secondary; a source of current of predetermined magnitude; a separate relay connected to each wire of the system, said relays having contacts connected to said source and to said system wires in a manner to provide a current path from one side of said source to the accidentally grounded line of the system, the other side of said source being grounded to provide an external ground path of low resistance between said source and the accidental ground whereby current flows from said source through said accidentally grounded line and accidental ground back to the source through the external ground path, the magnitude of said current being sufficient to induce a measurable voltage in the secondary of said transformer when the latter is positioned around a portion of the system through which said current flows in the accidentally grounded line.

2. In an apparatus for locating an accidental ground in a normally ungrounded electric power distribution system: a window type current transformer through which the lines of said system are passed, said transformer having a secondary winding; an electrical measuring instrument connected to said transformer secondary; a source of alternating current of predetermined magnitude; a separate relay connected to each wire of the system, said relays having contacts connected to said source and to said system wires in a manner to provide a current path from one side of said source to the accidentally grounded line of the system, the other side of said source being grounded to provide an external ground path of low resistance between said source and the accidental ground whereby current flows from said source through said accidentally grounded line and accidental ground back to the source through the external ground path, the magnitude of said current being sufficient to induce a measurable voltage in the secondary of said transformer when the latter is positioned around a portion of the system through which said current flows in the accidentally grounded line.

3. In an apparatus for locating an accidental ground in a normally ungrounded electric power distribution system: a first window type current transformer through which the lines of said system are passed, said transformer having a secondary winding; an electrical measuring instrument connected to said transformer secondary; a source of current; a second high reactance transformer having a primary winding connected to said source and having a secondary winding, said transformer being of the type which inherently limits the current flow available from its secondary winding to a predetermined amount; a separate relay connected to each wire of the system, said relays having contacts connected to said second transformer secondary winding and to said system wires in a manner to provide a current path from one side of said second transformer secondary winding to the accidentally grounded line of the system, the other side of said second transformer secondary winding being grounded to provide an external ground path of low resistance between said winding and the accidental ground whereby current flows from said winding through said accidentally grounded line and accidental ground back to the winding through the external ground path, the magnitude of said current being sufficient to induce a measurable voltage in the secondary of said first transformer when the latter is positioned around a portion of the system through which said current flows in the accidentally grounded line.

4. In an apparatus for locating an accidental ground in a normally ungrounded power distribution system having a source, having a main supply line connected to said source, having a branch feeder connected to said main supply line, and having a branch circuit connecting said branch feeder circuit to an electrically operated device: a window type current transformer through which the main supply line wires pass positioned between said source and said branch feeder circuit; a window type current transformer through which the branch feeder circuit wires pass positioned adjacent said main supply line; a window type current transformer through which the branch circuit wires for the electrically operated device pass positioned adjacent said electrically operated device; a current measuring instrument connected to one secondary terminal of each of said transformers; multi-contact switch means for selectively connecting each of the other secondary terminals of said transformers to said measuring instrument; and means for causing a current of sufficient magnitude to flow in the accidentally grounded line of said system to induce a measurable voltage in the secondary of each transformer through which said current passes in said accidentally grounded line whereby an accidental ground anywhere between said electrically operated device and said source may be located by successively completing the circuit between said measuring instrument and the terminals of each transformer secondary by use of said switch means and by checking said measuring instrument for transformer secondary voltage.

5. In an apparatus for locating an accidental ground on a normally ungrounded power distribution system having a source, having a main supply line connected to said source, having a plurality of branch feeders connected to said main supply line, and having a plurality of branch circuits connecting said branch feeder circuits to a plurality of electrically operated devices: a plurality of window type current transformers through which the main supply line wires pass positioned between said source and the adjacent branch feeder circuit and between successive branch feeder circuits; a window type current transformer for each branch feeder circuit and through which the wires of said feeder circuit pass positioned adjacent said main supply line; a window type current transformer for each branch circuit for an electrically operated device and through which the wires of said branch circuit pass positioned adjacent said electrically operated device; a current measuring instrument connected to one secondary terminal of each of said transformers; multi-contact switch means for selectively connecting each of the other secondary terminals of said transformers to said measuring instrument; and means for causing a current of sufficient magnitude to flow in the accidentally grounded line of said system to induce a measurable voltage in the secondary of each transformer through which said current passes in said accidentally grounded line whereby an accidental ground anywhere between any of said electrically operated devices and said source may be located by successively completing the circuit between said measuring instrument and the terminals of each transformer secondary by use of said switch means and by checking said measuring instrument for transformer secondary voltage.

6. In an apparatus for locating an accidental ground in a normally ungrounded power distribution system having a source, having a set of main supply lines connected to said source, having at least one set of branch feeder lines connected to said set of main supply lines, and having at least one set of branch lines for an electrically operated device for each set of branch feeder lines connecting said set of branch feeder lines to said electrically operated device; a window type current transformer having a closed core through which the set of main supply lines passes positioned between said source and said sets of branch feeder lines; a window type current transformer for each set of branch feeder lines having a closed core through which a set of branch feeder lines passes; a window type current transformer for each set of branch lines for an electrically operated device, said transformer having a closed core through which a set of branch lines for an electrically operated device passes; each transformer for a set of branch feeder lines being located between the set of supply lines and all sets of branch lines for the electrically operated devices connected thereto; a current measuring instrument connected to one secondary terminal of each of said transformers; switch means for selectively connecting each of the other secondary terminals of said transformers to said measuring instrument; and means for causing a current of sufficient magnitude to flow in the accidentally grounded line of said system to induce a measurable voltage in the secondary of each transformer through which said current passes in said accidentally grounded line whereby an accidental ground anywhere between said electrically operated device and said source may be located by successively completing the circuit between said measuring instrument and the terminals of each transformer secondary by use of said switch means and by checking said measuring instrument for transformer secondary voltage.

References Cited in the file of this patent

UNITED STATES PATENTS

| | | |
|---|---|---|
| 818,424 | Eastman | Apr. 24, 1906 |
| 2,326,149 | Light | Aug. 10, 1943 |
| 2,529,126 | Barnes | Nov. 7, 1950 |

FOREIGN PATENTS

| | | |
|---|---|---|
| 591,725 | Great Britain | Aug. 27, 1947 |